United States Patent
Anderson

(10) Patent No.: US 7,163,652 B1
(45) Date of Patent: Jan. 16, 2007

(54) PROCESS FOR PRODUCING CO-EXTRUDED PROFILES

(75) Inventor: Richard N. Anderson, Whitesville, KY (US)

(73) Assignee: Hunter Douglas, Upper Saddle River, NJ (US)

( * ) Notice: Subject to any disclaimer, the term of this patent is extended or adjusted under 35 U.S.C. 154(b) by 431 days.

(21) Appl. No.: 10/702,628

(22) Filed: Nov. 6, 2003

Related U.S. Application Data

(60) Provisional application No. 60/434,890, filed on Dec. 20, 2002.

(51) Int. Cl.
*B29C 47/02* (2006.01)

(52) U.S. Cl. ............ 264/157; 264/160; 264/167; 264/171.13

(58) Field of Classification Search ............ None
See application file for complete search history.

(56) References Cited

U.S. PATENT DOCUMENTS

| | | | | |
|---|---|---|---|---|
| 1,822,209 A | * | 9/1931 | Gammeter | 83/56 |
| 2,902,083 A | * | 9/1959 | White | 156/136 |
| 3,874,833 A | * | 4/1975 | Ancker | 425/115 |
| 4,221,756 A | * | 9/1980 | Piper et al. | 264/171.21 |
| 4,274,821 A | * | 6/1981 | Kiemer | 425/114 |
| 4,667,550 A | * | 5/1987 | Eiting | 83/56 |
| 5,229,056 A | * | 7/1993 | De Meyer et al. | 264/171.12 |
| 5,669,120 A | * | 9/1997 | Wessels et al. | 24/446 |
| 5,851,467 A | * | 12/1998 | Murasaki | 264/167 |
| 7,056,110 B1 | * | 6/2006 | Abdallah | 425/114 |

* cited by examiner

*Primary Examiner*—Mark Eashoo
(74) *Attorney, Agent, or Firm*—Camoriano and Associates; Theresa Fritz Camoriano; Guillermo Camoriano

(57) ABSTRACT

A process for making co-extruded profiles includes forming a plurality of web-interconnected profiles, which travel together through a die.

12 Claims, 7 Drawing Sheets

US 7,163,652 B1

PROCESS FOR PRODUCING CO-EXTRUDED PROFILES

This application claims priority from U.S. Provisional Application Ser. No. 60/434,890 filed Dec. 20, 2002.

BACKGROUND OF THE INVENTION

The present invention involves a method for producing co-extruded profiles. More specifically, the present invention discloses a method for making a co-extruded profile at a substantially reduced cost of manufacture.

SUMMARY

A co-extruded profile, such as a stile for a window shutter, may be made by feeding a substrate material, such as a profile made of Medium Density Fiberboard (MDF), which is relatively inexpensive, through an extrusion die in order to coat the profile with a skin, such as a thermoplastic polypropylene extrusion.

In the production of plastic extrusions, it is possible to have two or more identical cavities in the same tool where there exists the available plasticizing capacity to accommodate these additional cavities. However, in the case of a product which is first formed, molded, or extruded and must then be encapsulated in a coating, the situation becomes more complicated. The final product is actually an encapsulated substrate, not just an extrusion. It becomes difficult to handle and feed multiple substrates into the same extrusion tool at the same rate of speed and to do so with minimal handling costs. These substrates must be fed at exactly the same rate of speed, or the die will not remain in balance, resulting in malformed extrudate.

The present invention discloses a method wherein two or more identical profiles are formed side by side, with the individual profiles joined together by a thin wall or web of material, preferably, but not necessarily, of the same material as the substrate. This interconnecting web of material is thick enough to maintain structural integrity during reasonable handling of the profiles during the balance of the manufacturing process and keeps the profiles traveling together through the process. In a preferred embodiment, the multiple profiles with the interconnecting webs are formed by cutting them from a single sheet of material, but other known methods of forming the interconnected substrates could be used, including molding, extruding, and other known methods.

The web preferably comprises a thicker center portion which necks down to a thinner section at the point where the web joins the main body of the substrate to ensure that the web is subsequently separated from the profile and that this separation takes place cleanly at the face of the profile.

The multiple interconnected substrates are introduced to the feeding device for the extrusion process (which normally accommodates a single profile). This feeding device pushes the multiple interconnected substrates toward and into the extrusion die. Stationed between the die and the feeding device (or the feeding tractor as it is sometimes called) is a mechanism for cutting the webs away from the substrate, such as a set of stationary knives which are inclined at an angle so that, as the multiple substrates are pushed through the knives, the knives separate the thin web from the main body of the profile and deflect the web downwardly and out of the path of the extrusion die.

The main body of the multiple interconnected substrates is held together by the webs for the majority of its length prior to entering the die, ensuring that all pieces enter the die simultaneously. The web further continues to hold at least a portion of the substrates together until only a short piece of the material is left to enter the die, ensuring that the multiple cavities are all produced at the same rate. This means that they will exit the die at the same rate and in even sets, making them easy to handle and resulting in a consistently good quality extrusion coating the profiles with no voids or malformed extrudate.

During the manufacturing process, the operators handle two, three, four, or more pieces in the same manner as would normally be required to handle a single piece, thus substantially reducing labor costs. The machinery is also producing two, three, four, or more pieces in the same unit of time as would normally be required to produce a single piece. Thus, the entire processing cost is correspondingly reduced.

DESCRIPTION OF THE PREFERRED EMBODIMENTS

Figure 1:
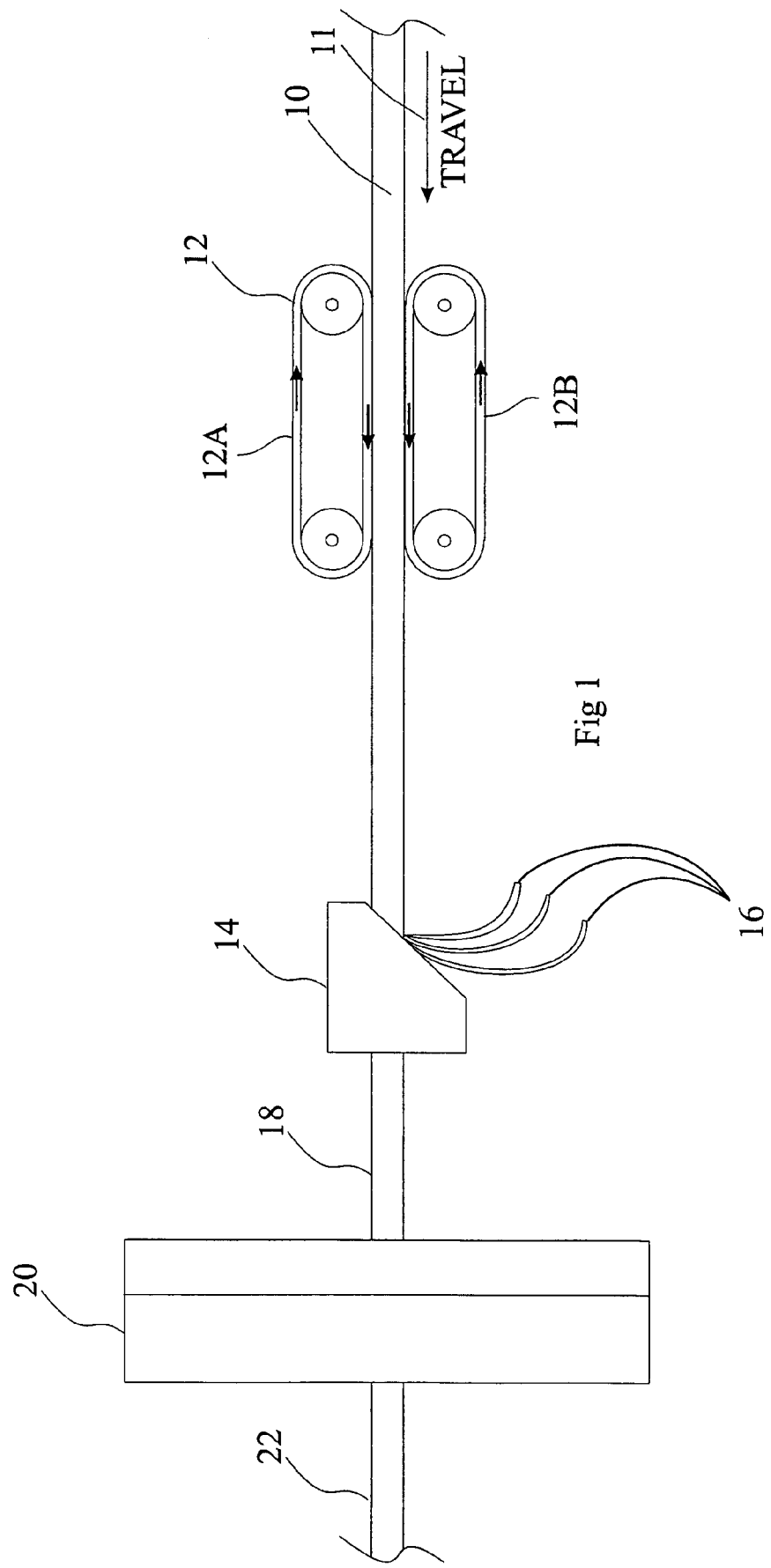
FIG. 1 is a schematic view of a manufacturing process in accordance with the present invention, showing the interconnected substrates traveling past the tractor feeding device, the inclined stationary knives (slitter) separating the web from the substrates, and the extrusion die.

FIG. 1 schematically depicts a manufacturing process in accordance with the present invention. Web-interconnected substrates 10 (see FIG. 2) are made by cutting a sheet of material, or by extrusion, or by any other method known in the industry (such as casting or even by fabrication). These substrates 10 have the same cross-sectional shape throughout their length. The connected substrates 10 are fed via a tractor feeding device 12 through a slitter 14, shown better in FIGS. 5–7, which separates the webs 16 from the profiles 18, and then through a die 20, downstream from the slitter 14. The tractor feeding device 12 shown here includes upper and lower belts 12A, 12B, at least one of which is driven. The belts 12A, 12B press against the top and bottom surfaces of the profiles 18 and drive the profiles in the direction shown by the arrow 11. The slitter 14 separates the profiles 18 from each other so they can be completely coated over their entire perimeter as they pass through the extrusion die 20, which is downstream from the slitter 14. In this preferred embodiment, the substrates 10 lie side-by-side, aligned horizontally, but other arrangements are also contemplated.

Figure 2:
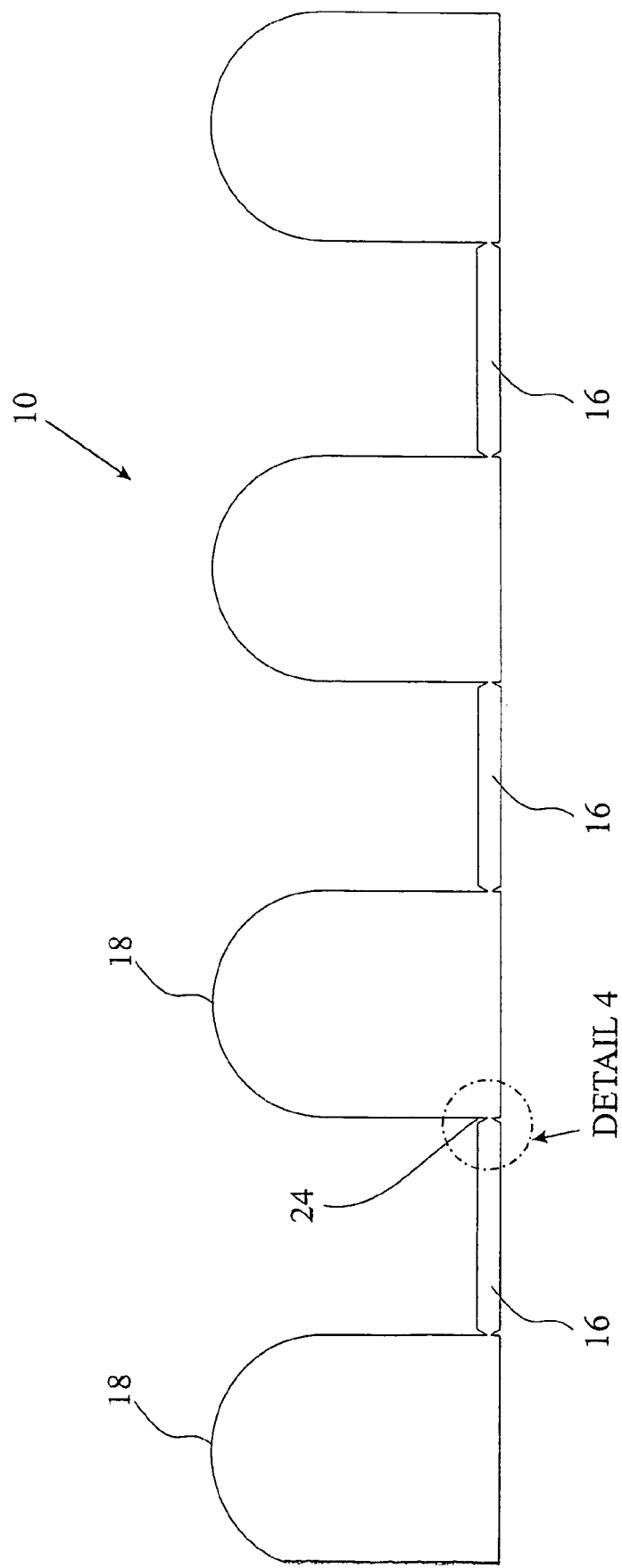
FIG. 2 is an end view showing an example of web-interconnected substrates made in accordance with the present invention.
Figure 4:
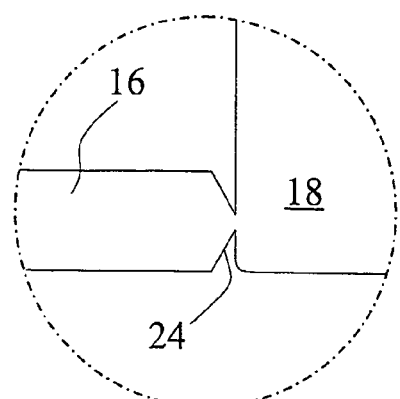
FIG. 4 is an enlarged view of detail 4 of FIG. 2.

FIG. 2 depicts a typical instance of web-interconnected substrates 18, which are connected to each other via thin walls or webs 16. As shown in detail in FIG. 4, the webs 16 are necked down in the area where the web 16 joins the main body of the profile 18, forming a chamfer 24, which, in this embodiment, encompasses a 30 degree angle. This necking down aids in the slitting process and in the deflection of the separated webs 16 from the path of the profiles 18, as will be explained later. At the chamfer 24, the thickness of the web 16 is still great enough to provide structural integrity during reasonable handling of the profiles 18 during the balance of the manufacturing process, but it is still substantially thinner than the rest of the web 16.

FIG. 2 shows four identical profiles 18 joined by three interconnecting webs 16. In order to take advantage of economies of scale, the number of profiles 18 can be as few as two or may be in excess of the four profiles 18 shown. In this particular preferred embodiment, the webs 16 and the profiles 18 are made from the same substrate material in one machining operation from a single sheet of substrate material.

Figure 5:
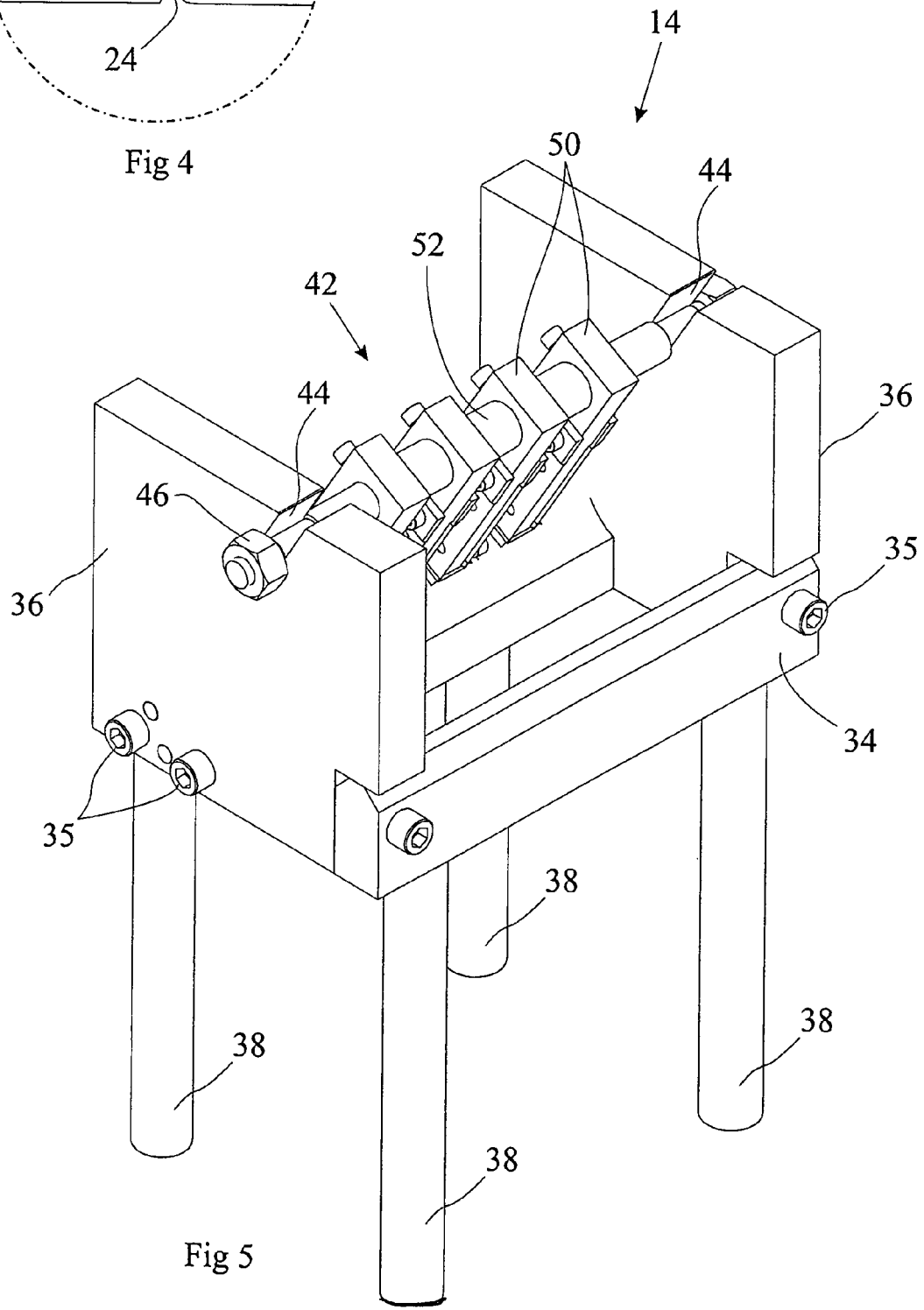
FIG. 5 is a perspective view of the slitter of FIG. 1.

FIG. 5 shows a slitter 14 including stationary knives, which are used to separate the webs 16 from the profiles 18, as shown in FIG. 1. The slitter 14 shown in FIG. 5 has a total of eight cutting blades (See FIGS. 6 and 7, one pair of blades 62 on each blade holder 56) and thus would likely be used for a five web-interconnected profile assembly (not shown). The four web-interconnected profile assembly 10 of FIG. 2 would only use three blade holders for a total of six-blades, as explained below.

Figures 6, 7:
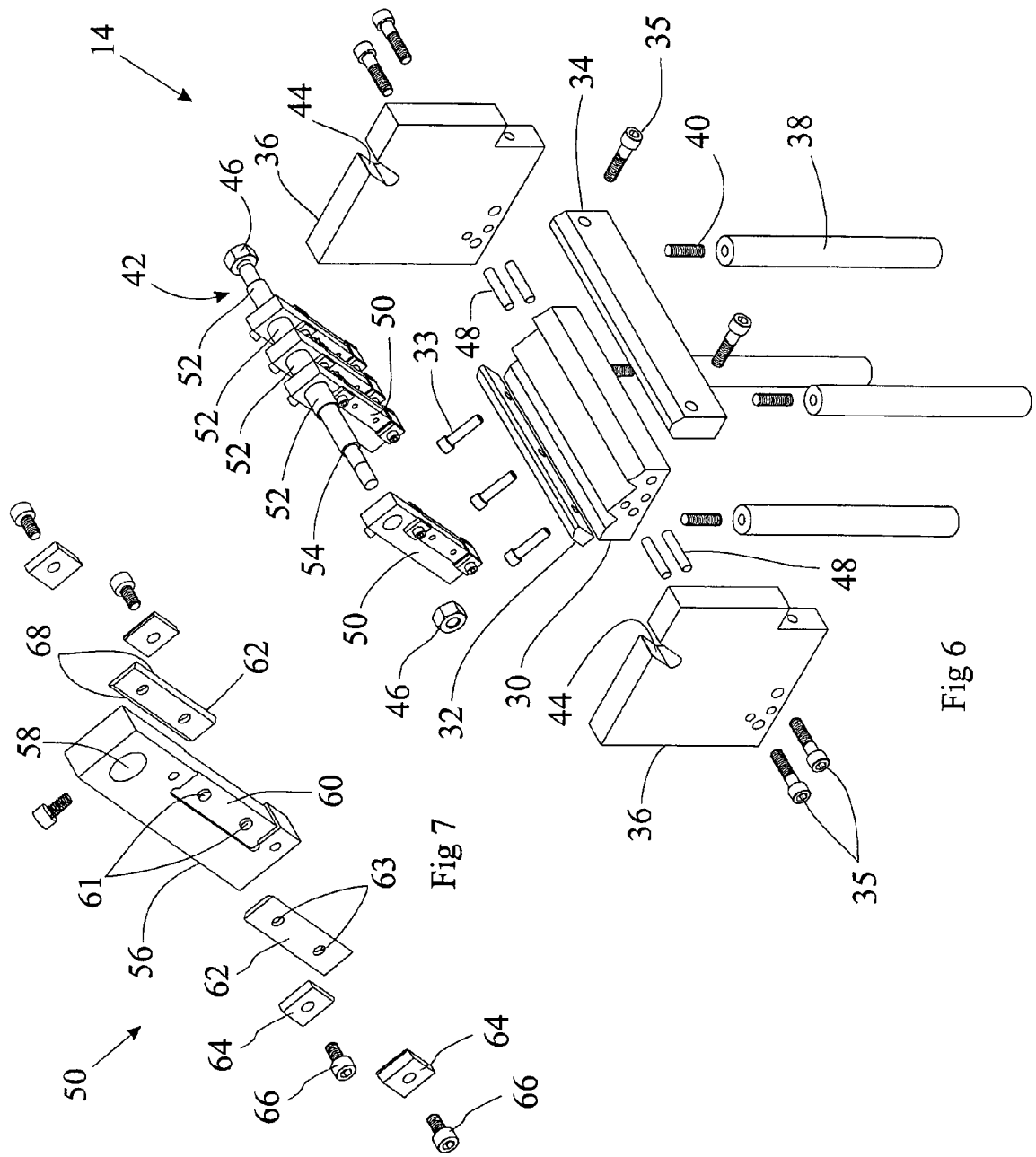
FIG. 6 is an exploded perspective view of the slitter of FIG. 5.
FIG. 7 is an exploded perspective view of the knife subassembly of the slitter of FIG. 6.

FIG. 6 is an exploded view of the slitter 14 of FIG. 5, which includes a clamp base 30, a clamp bar 32 across the rear of the base 30 and secured to the base via clamp bar screws 33, a support beam 34 across the front of the base 30 and secured to the base via body screws 35, two side plates 36, which are secured to the sides of the base 30 via additional body screws 35, legs 38, which attach to the base via threaded studs 40, and a blade holder rod assembly 42, which is described in more detail below and which slides into slots 44 on the side plates 36 and is clamped against the base 30 via the clamp bar 32. Nuts 46 also help secure the blade holder rod assembly 42 onto the slitter 14, and alignment pins 48 assist in the accurate assembly of the slitter 14.

The blade holder rod assembly 42 comprises a plurality of blade holder sub-assemblies 50 (as shown in an exploded view in FIG. 7), mounted on a support rod 54 and separated by a plurality of tube spacers 52 to provide the correct spacing between the blade holder sub-assemblies 50. The tube spacers 52 are sized to be exactly as long as the individual profiles 18 are wide. The blade holders 56 (See FIG. 7) are sized to be exactly as wide as the width of the webs 16 between the individual profiles 18. Preferably, all the webs 16 are of a standardized and identical width such that the same blade holder 56 may be used at any position in the slitter 14 as well as using the same blade holder 56 for any size profile 18 being processed. To accommodate different width profiles 18, it is simply a matter of replacing the tube spacers 52 with spacers 52 of the correct length dimension to properly locate the multi-profile substrate 10 in the slitter 14. Typically, all the tube spacers 52 in use at a given time on the slitter 14 are of the same length.

The blade holder sub-assemblies 50 (as shown in an exploded view in FIG. 7) include a blade holder 56, with a through-hole 58 which receives the support rod 54, and longitudinal depressions 60 on either side of the blade holder 56, each receiving a blade 62. Each longitudinal depression 60 defines a pair of threaded openings 61, and each blade 62 has a corresponding pair of openings 63. The blades 62 are secured to the blade holder 56 via blade clamps 64 and cap screws 66. The blade clamps 64 press against the outer surface of their respective blade 62, and the cap screws 66 have a threaded shaft that extends through the respective clamp 64, and through the respective hole 63 in the blade 62, and are threaded into the threaded opening 61 in the blade holder 56. The blades 62 preferably have a 30 degree beveled edge 68 on both of their top and bottom longitudinal edges so that the blades 62 are reversible and so that the sharp edge 68 of the blade 62 is received in and guided by the 30 degree chamfer 24 where the web 16 necks down to meet the profile 18. While this preferred embodiment has an angle of thirty degrees on the blade and the chamfer, the angles need not be exact. It is preferred that the angle of the chamfer be acute, and it is preferred that the angle of the bevel on the blade approximately match the angle of the chamfer. This helps ensure a clean cut and separation of the web 16 at the point where it meets the main body of the profile 18.

The blade holder rod assembly 42 is mounted at an angle to the horizontal (relative to the incoming path of the interconnected substrates 10) so that, as the interconnected substrates 10 are fed into the slitter 14 by the tractor feed 12, the blades 62 cut the web 16 from the profiles 18 at the point where the web 16 necks down where it meets the profile 18. The now separated profiles 18 continue their uninterrupted path straight through the slitter 14. However, the separated webs 16 impact against the blade holders 56 and, due to the angle of incline of the blade holders 56 relative to the incoming path of the interconnected substrates 10, the webs 16 are deflected downwardly, away from the separated profiles 18 and the extrusion die 20 (as seen in FIG. 1), which lies straight ahead and receives the separated profiles 18.

Figure 8:
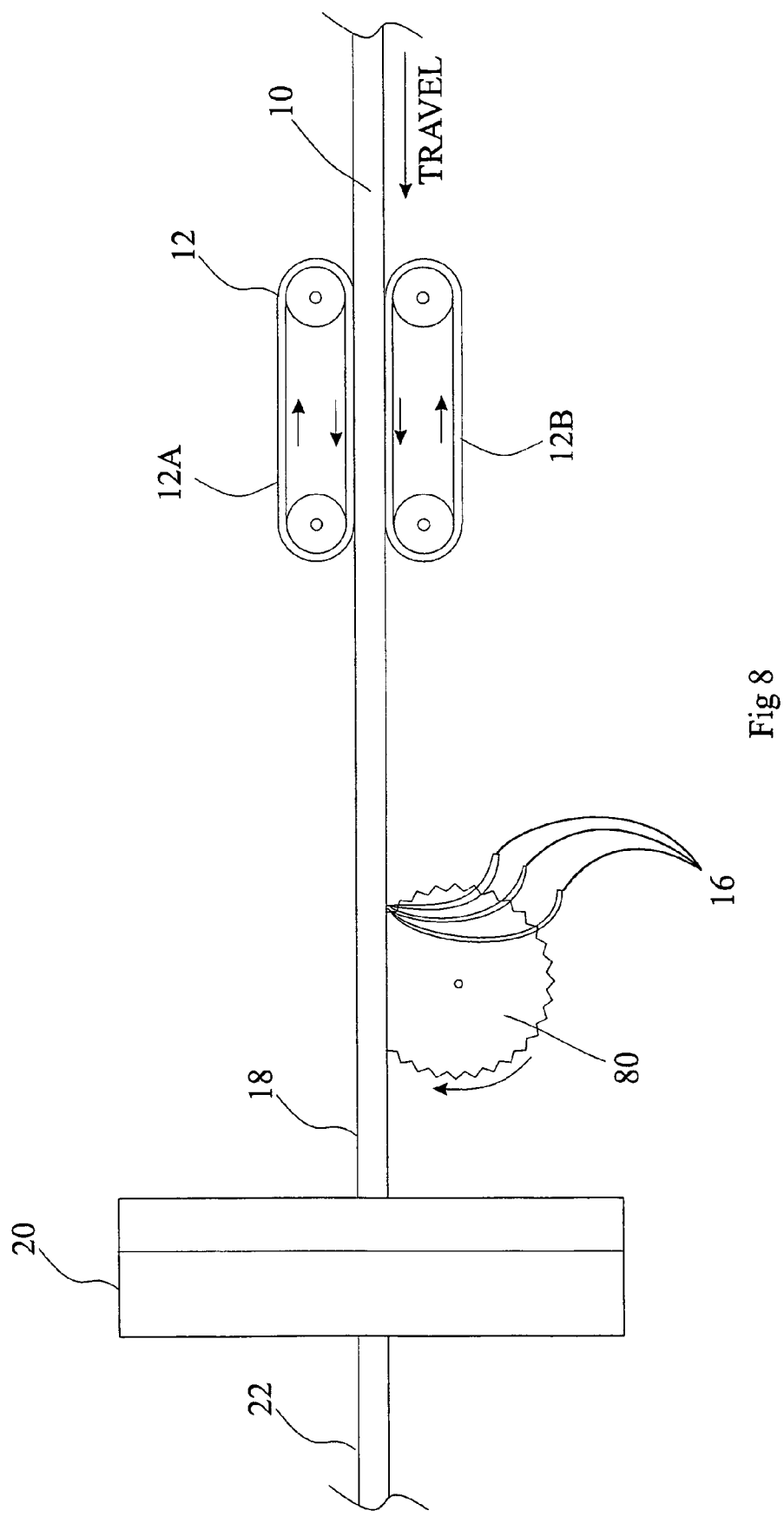
FIG. 8 is a schematic view of an alternate manufacturing process in accordance with the present invention, showing the interconnected substrates traveling past the tractor feeding device, and a rotating saw (instead of the inclined stationary knives of FIG. 1) separating the web from the substrates, and the extrusion die.

While this description describes stationary blades being used to cut the webs, other types of cutting mechanisms could be used instead, such as a series of driven saw blades 80 (as shown in FIG. 8) at the same positions as the stationary blades. The saw blades could be mounted on a common arbor and driven together, or each saw blade could have its own drive.

Figure 2A:
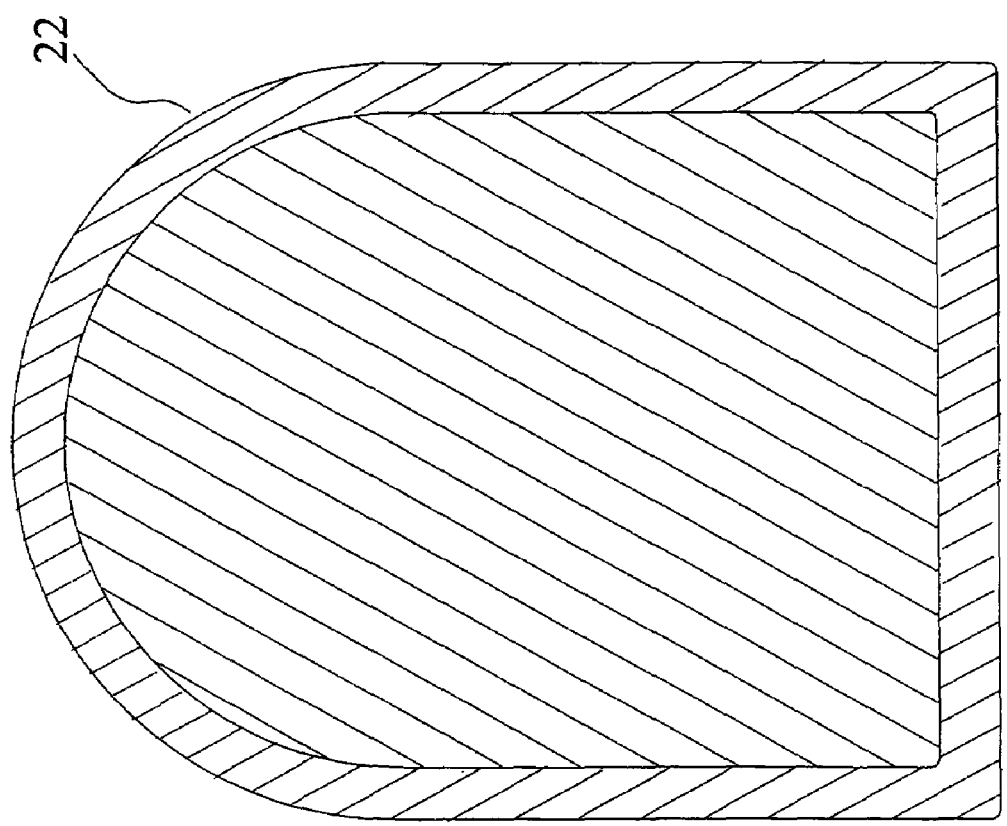
FIG. 2A is a section view through one of the substrates of FIG. 2 after it has been coated.
Figure 3:
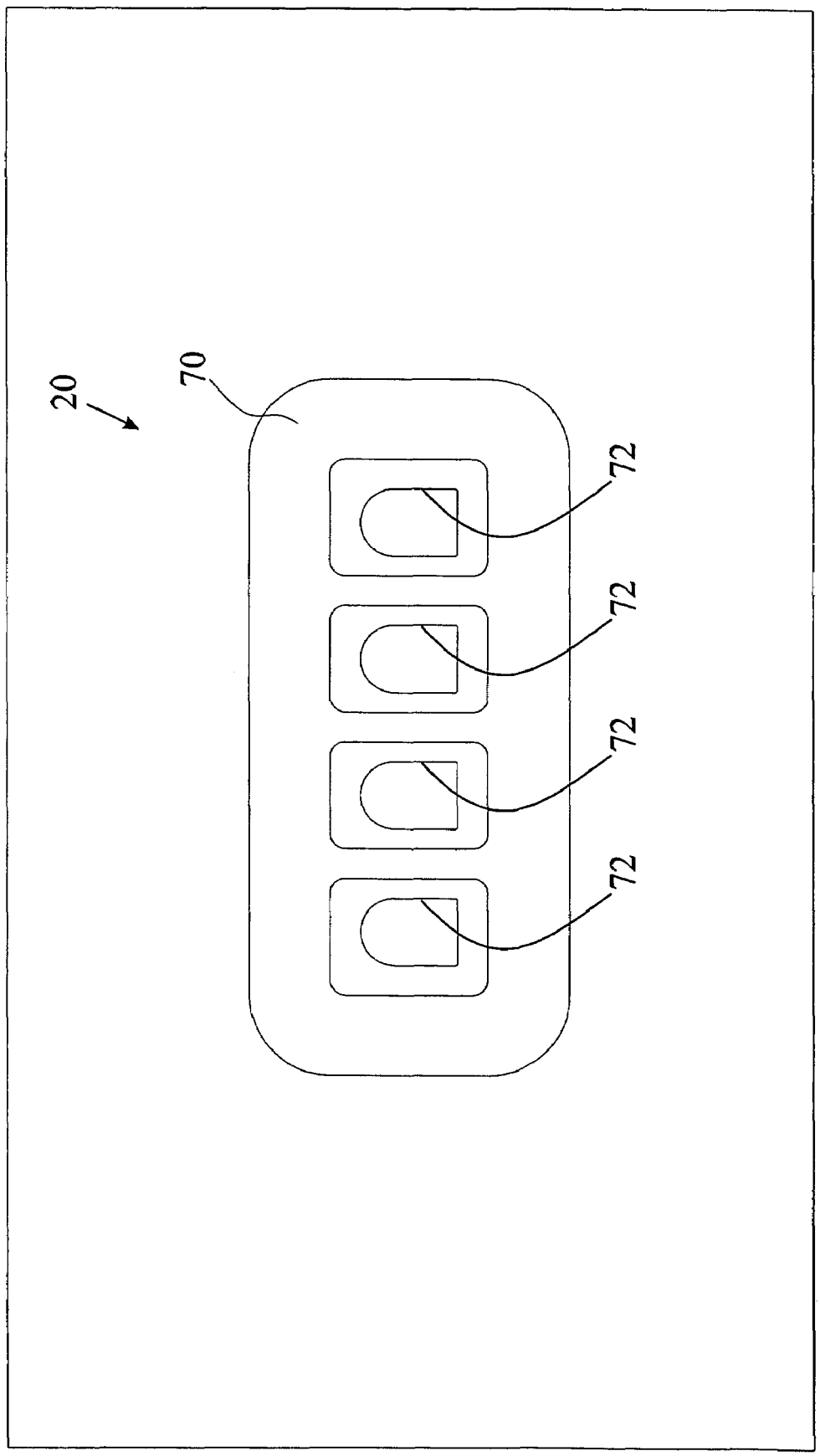
FIG. 3 is an end view of the extrusion die head which would be used for the interconnected substrates of FIG. 2.

FIG. 3 shows a die face 70 of the extrusion die 20, which is used for coating the separated profiles 18. The four cavities 72 receive the four profiles 18, and a coating, such as a thermoplastic polypropylene, is applied (co-extruded) onto the exposed surfaces of the profiles 18, coating the entire perimeter of the profile, and resulting in the finished, co-extruded profiles 22 (See FIGS. 1 and 2A).

FIG. 8 shows an alternative process, in which rotating blades 80 replace the slitters 14 of the first embodiment. These rotating blades 80 are arranged parallel to each other so that they all rotate about the same axis of rotation.

Only a single embodiment of the profiles has been shown and described, as it is not practical to describe all the possible variations and combinations that could be made within the scope of the present invention. For instance, the number of web-interconnected profiles may be as few as two, or it may exceed the four profiles shown in FIG. 2. The interconnecting webs 16 preferably neck down where they meet the profiles 18, as shown best in FIG. 4, but the webs need not necessarily neck down at all and may be of the same width throughout or even may become thicker where they meet the profiles 18 for additional structural integrity.

It will be obvious to those skilled in the art that many other modifications may be made to the embodiments described above without departing from the scope of the invention as claimed.

What is claimed is:

1. A process for making co-extruded profiles, comprising the steps of:
    forming a plurality of profiles that are interconnected by webs; and
    feeding said web-interconnected profiles through an extrusion die, where they are coated by a thermoplastic material.

2. A process for making co-extruded profiles, comprising the steps of:
    forming a plurality of profiles that are interconnected by webs;
    feeding said web-interconnected profiles into an extrusion die, where they are coated by a thermoplastic material; and
    cutting said web-interconnected profiles apart from each other as they are being fed into the extrusion die, such that the profiles pass through the die with the webs removed, and such that the remaining web that has not yet been cut away holds the profiles together so that they travel along together through the die.

3. A process for making co-extruded profiles as recited in claim 2, wherein said webs have a thicker center portion which necks down to a thinner section at the point where the web joins its respective profile.

4. A process for making co-extruded profiles as recited in claim 3, wherein said necking down defines a chamfer with an acute included angle.

5. A process for making co-extruded profiles as recited in claim 2, wherein the cutting is done by slitting with a sharp blade.

6. A process for making co-extruded profiles as recited in claim 5, wherein said cutting is done by a plurality of stationary knife blades inclined at an angle to the direction of travel of said profiles, such that, as said web-interconnected profiles are pushed past said blades, said blades separate said webs from said profiles and deflect at least one of said one of said webs away from said path.

7. A process for making co-extruded profiles as recited in claim 5, wherein the slitting is done by a set of stationary knives which are inclined at an angle to the direction of travel of the profiles, such that, as said web-interconnected profiles are pushed past the knives, the webs are separated from their respective profiles.

8. A process for making co-extruded profiles as recited in claim 2, wherein said webs extend along most of the length of said profiles prior to being cut away.

9. A process for making co-extruded profiles as recited in claim 6, wherein said stationary knife blades are mounted on a rod and are separated by tube spacers, which are approximately as long as the width of the profile that passes adjacent to the respective knife.

10. A process for making co-extruded profiles as recited in claim 9, wherein said stationary knife blades are mounted on blade holders, which have the same width as the web to be cut by the knife blades.

11. A process for making co-extruded profiles as recited in claim 2, wherein said cutting is done by a plurality of moving saw blades.

12. A process for making co-extruded profiles as recited in claim 11, wherein said saw blades rotate about a common axis of rotation.

* * * * *

UNITED STATES PATENT AND TRADEMARK OFFICE
CERTIFICATE OF CORRECTION

PATENT NO. : 7,163,652 B1  
APPLICATION NO. : 10/702628  
DATED : January 16, 2007  
INVENTOR(S) : Richard N. Anderson It is certified that error appears in the above-identified patent and that said Letters Patent is hereby corrected as shown below:

Col. 5,
Delete Claim 1.

Signed and Sealed this

Twenty-seventh Day of March, 2007

JON W. DUDAS  
*Director of the United States Patent and Trademark Office*